Dec. 19, 1944. P. RIEGGER 2,365,435
INDICATING MEANS FOR TAXIMETERS
Filed Dec. 14, 1940 3 Sheets-Sheet 1

Inventor:
PAUL RIEGGER
by
Attorney:
Harold D. Penney

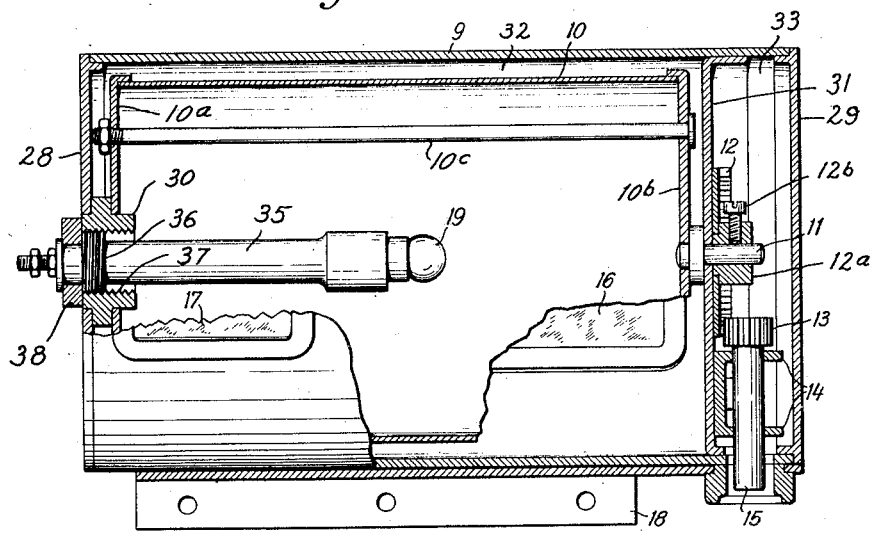
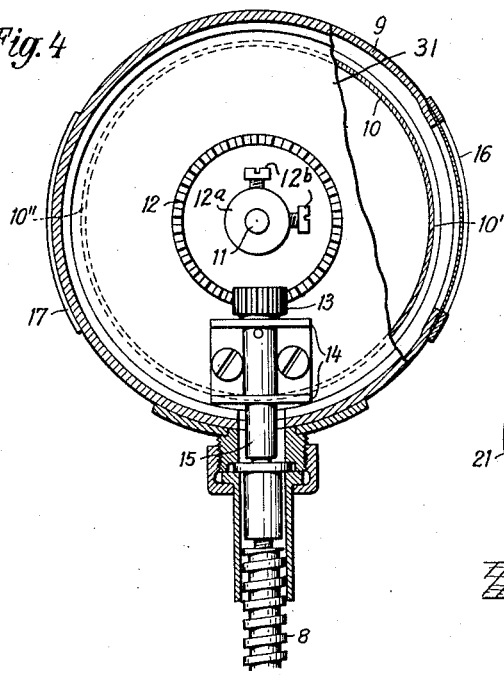
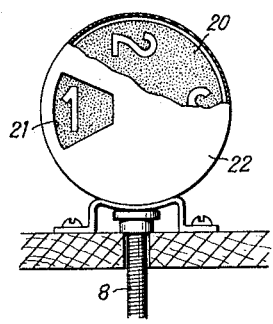

Dec. 19, 1944.  P. RIEGGER  2,365,435
INDICATING MEANS FOR TAXIMETERS
Filed Dec. 14, 1940  3 Sheets-Sheet 3

Inventor:
PAUL RIEGGER
by
Attorney:
Harold D. Penney

Patented Dec. 19, 1944

2,365,435

UNITED STATES PATENT OFFICE 2,365,435

INDICATING MEANS FOR TAXIMETERS

Paul Riegger, Villingen, Schwarzwald, Germany; vested in the Alien Property Custodian Application December 14, 1940, Serial No. 370,154
In Germany August 28, 1939

3 Claims. (Cl. 116—46)

This invention relates to improvements in taximeters of the type used in public conveyances, such as taxicabs, for the purpose of registering the fare and indicating whether the conveyance is "hired" or "vacant."

It already has been suggested to provide means in taximeters of the type referred to for mounting the portion of the device indicating whether the taxicab is "hired" or "vacant," at a conspicuous point on the craft separately from the fare registering device, and to provide electrical connecting means between the separate indicator and the fare registering device, for simultaneously operating the indicator and the fare registering device to adjust either of two positions, i. e. "hired" or "vacant."

It is an important object of the invention to provide connecting means, which permit adjustment of the indicator to more than two positions, for indicating the tariff registered by the taximeter, so as to readily enable the police or the inspectors of the operating company as well as the passenger to ascertain whether the prescribed tariff has been switched in.

With these and further objects in view, as may become apparent from the within disclosures, the invention consists not only in the structures herein pointed out and illustrated by the drawings, but includes further structures coming within the scope of what hereinafter may be claimed.

The character of the invention, however, may be best understood by reference to certain of its structural forms, as illustrated by the accompanying drawings in which:

Fig. 3 is an elevation, partly in an axial section, of the indicator, on a larger scale.

Fig. 4 is a cross sectional view of the same indicator, on a similar scale as Fig. 3.

Fig. 5 is a side view, showing a modification.

Similar characters of reference denote similar parts in the different views.

Figure 1:
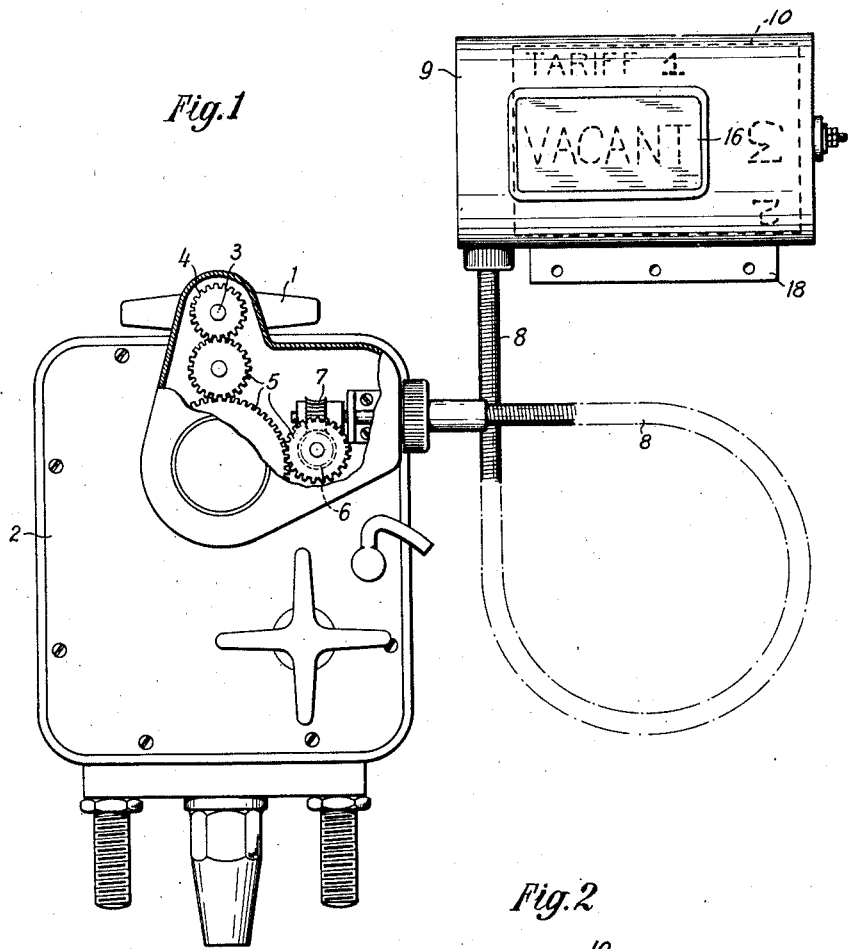
Fig. 1 is a rear elevation of the fare registering device and the indicator, as viewed from a point outside the car.
Figure 2:
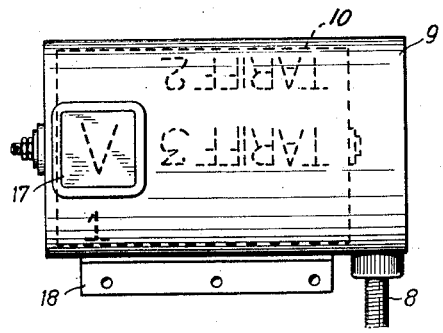
Fig. 2 is an elevation showing the side of the indicator facing the driver and the passenger in the car.

As here shown, I provide a mechanical transmission gear, preferably including a flexible shaft, between the switching lever of the fare registering device and the indicator, for controlling the indicator in accordance with the various "vacant" and "hired" positions of the switching lever corresponding to the tariff applying at that time. These mechanical transmitting means permit the adjustment of the indicator, for instance, to tariff "1," tariff "2" or tariff "3," by simple, and reliable means. Moreover, where the indications of the indicator have to be changed in accordance with alternations of the traiff regulations, this may be effected by merely interchanging the indicating member, for instance, a drum member bearing the various indications and mounted to turn in a housing, while it is not required to exchange the gear system itself. For example, if the switching lever of the fare registering device has four positions, the circumference of the indicator drum will be divided into four equal parts.

Referring now to the drawings in greater detail, the fare registering device 2 which may have mechanism of the general type of U. S. Patent No. 1,566,038, is provided with a switching lever 1, which serves to switch off the driving gear of the device ("vacant" position) or to switch in any one of a number of tarffs. By turning the lever 1, a pinion 4 on the lever shaft 3 is rotated, transmitting its rotation, through intermediate gears 5, to a worm 6 meshing with a worm wheel 7. The worm wheel 7 in turn is operatively connected with a flexible shaft 8 arranged between the fare registering device 2 and the indicator 9, whereby the switching motion is transmitted from the switching lever 1 through the gears and flexible shaft to a gear system within the indicator casing 9.

As will be noted from Figs. 3 and 4, a drum or cylinder 10 is turnably mounted in the cylindrical indicator casing 9. The casing 9 has the ends thereof closed by removable covers or disks 28 and 29, said disk 28 having a bearing 30 fixedly mounted therein and projecting on the interior of the casing, which bearing rotatably supports the adjacent end 10a of cylinder 10. The other end 10b of the cylinder has a short shaft 11 extending therefrom in alinement with bearing 30 and rotatably penetrating an adjacent partition 31 disposed within the casing. Suitable rods 10c are employed for removably holding the ends 10a and 10b in engagement with cylinder 10. It is thus seen that the partition 31 divides the interior of casing 9 into compartments 32 and 33, the compartment 32 being adapted to accommodate cylinder 10 and the compartment 33 being adapted to accommodate portions of the driving means for the cylinder which will be later described.

The above-mentioned short shaft 11 projects a substantial distance beyond partition 31 and into compartment 33. On this projecting portion the hum 12a of a toothed face wheel 12 is adjustably secured by any suitable means such as set screws 12b. A pinion 13 is adapted to mesh with the teeth of face wheel 12, said pinion being disposed on one end of a shaft 15. The shaft 15 of the pinion is supported in a bearing 14 secured to partition 31, and operatively connected to the flexible shaft 8. Thus, the switching motions of the handle 1 are mechanically and positively transmitted to the drum 10 which may be moved into different positions in its casing 9 under control of the lever 1.

Figure 6:
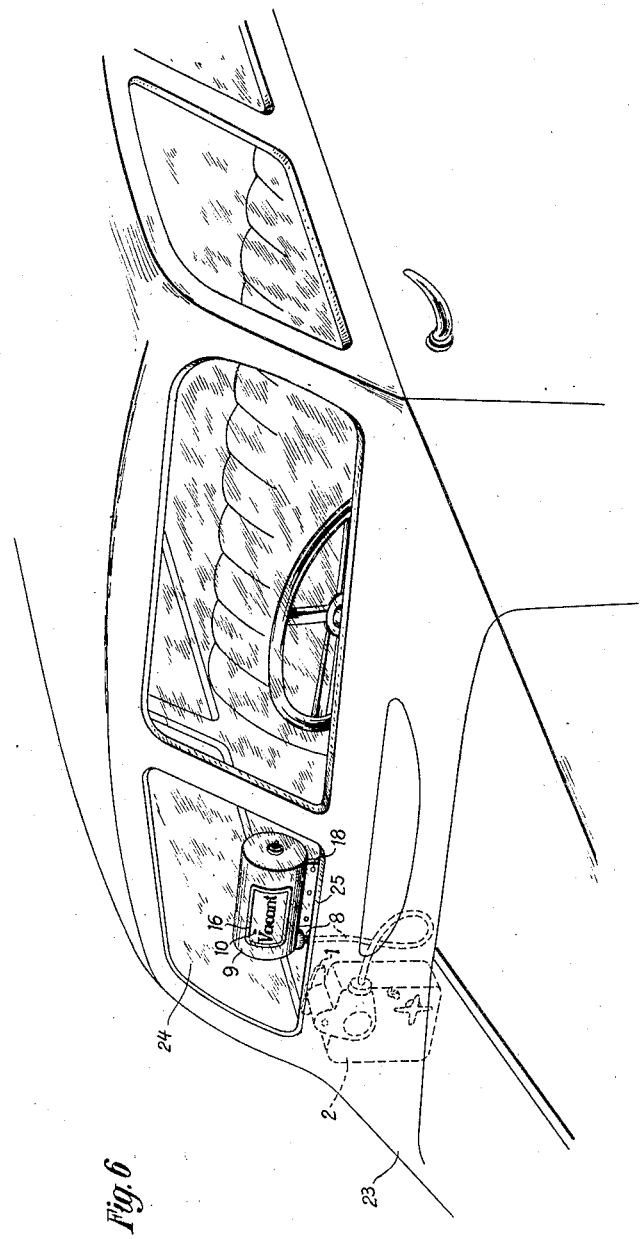
Fig. 6 is a perspective view showing one mode of mounting the device in the taxicab.

The casing 9 is formed with diametrically opposed apertures 16 and 17 which may be closed by transparent glass plates or the like. The casing may be secured by means of its holder bar 18 in the interior of the car 23, Fig. 6, at the lower frame portion 25 of the wind guard 24, the larger window 16 of the indicator 9 thus being visible from the outside, while the smaller window 17 faces the inside of the car.

The various characters "vacant," "tariff 1," "tariff 2," "tariff 3," are spaced on the face 10' of the drum 10, and these characters may be successively positioned opposite window 16 on the face 10'' and axially staggered or offset relative to the first named characters, the characters "V," "1," "2," and "3" are spaced so as to be successively positioned opposite window 17 (see Fig. 4) Therefore, if the drum by suitable adjustment of the switch lever 1 is adjusted, for example to "tariff 1," the character "tariff 1" will appear at the forward window 16 to be viewed from the exterior of the cab, and the character "1" will simultaneously appear at the window 17 to be viewed by the driver and passengers. Likewise, other positions of the drum will simultaneously present the characters "vacant" and "V," "tariff 2" and "2," and "tariff 3" and "3" at the front and rear windows. Since the window 16 is offset axially relative to the window 17, the entire periphery of the drum may be utilized by each set of characters. In other words, the characters "vacant," "tariff 1," etc., may be spaced throughout 360° and the corresponding characters "V," "1," etc., may be spaced in similar manner but at a different position axially of the drum. The staggering of windows 16 and 17 permits the inside diametrically opposed surfaces of the casing 9 to be employed as reflecting surfaces for the respective opposed windows.

It is desirable to make the hollow cylinder 10 bearing the characters to be displayed from a transparent material so that the characters to be indicated may be illuminated by an electric bulb 19 centrally disposed within the drum 10. The bulb 19 is supported by a socket member 35, which member has a threaded portion 36 secured in threaded bore 37 on the interior of bearing 30. A lock nut 38 is provided to hold the socket member in position.

By way of alternative, the drum 10 may be replaced by a rotary disc 20, Fig. 5, disposed in a casing 22 behind opposite windows 21 thereof, and bearing the characters "1," "2," "3," etc. on its opposite faces. The gear system between the flexible shaft 8 and the disc 20 in this case may be arranged in the same manner as indicated in Figs. 3 and 4, except that the longitudinal drum 10 is to be substituted by the flat disc 20. The axis of rotation of the disc 20, when installed upon a car, will be positioned parallel to the longitudinal axis of the car instead of transversely, as in the preceding form. Therefore, when the numeral "1" is visible through the aperture 21 facing the driver, a second number "1" will be simultaneously viewable through an identical aperture facing the front section of the car.

The method and apparatus of the present invention have been described in detail with reference to specific embodiments. It is to be understood, however, that the invention is not limited by such specific reference but is broader in scope and capable of other embodiments than those specifically described and illustrated in the drawings.

I claim:

1. An indicator for indicating tariff rates of a taximeter comprising, in combination, a cylindrical housing having closed ends; a partition in said housing thereby dividing the interior thereof into two compartments, each compartment having substantially the same inside diameter; a hollow cylinder having its curved wall of translucent material and being disposed in one of said compartments, said cylinder having two sets of circumferentially arranged corelated sets of indicia on opposite sides of a plane transverse to the longitudinal axes of the cylinder and housing, the corresponding indicia of the respective sets being angularly displaced relative to each other upon the cylinder circumference, one end of said cylinder being provided with an axially located bearing opening; a hollow shaft carried by said housing and penetrating said bearing opening; a slender lamp socket mounted in said hollow shaft and projecting substantially coaxially to the middle of the cylinder; a second shaft extending from said cylinder and being axially alined with said hollow shaft, said second shaft being rotatably mounted in said partition, said housing having a window in the periphery thereof for exposing a portion of one of said sets of indicia and a second window for simultaneously exposing the corresponding indicia of the other set, said windows being also positioned on opposite sides of said transverse plane, a train of driving gears disposed in said other compartment and operatively connected to said second shaft, and means for removably securing said end which is disposed adjacent said other compartment to said housing.

2. Indicating means for taximeters comprising a meter casing having a compartment therein within which a train of gears are supported, a cylindrical housing having a drum compartment and gear compartment therein, a cylindrical drum rotatably mounted in said drum compartment; the periphery of said drum having two sets of circumferentially arranged corelated sets of indicia disposed on opposite sides of a plane transverse to the longitudinal axes of the drum and housing, the corresponding indicia of the respective sets being angularly displaced relative to each other upon the drum circumference, and said housing having a window in the periphery thereof for exposing a portion of one of said sets of indicia and a second window for simultaneously exposing the corresponding indicia of the other set, said windows being also positioned on opposite sides of said transverse plane, a shaft extending axially from said drum into said gear compartment; a driving means operatively connected to said shaft and disposed in said gear compartment; and a flexible torsional drive shaft connecting said driving means with said train of gears.

3. An indicator for indicating tariff rates of a taximeter comprising in combination, a tubular housing; and a tubular drum rotatably mounted in said housing, the periphery of said drum having two sets of circumferentially arranged co-related sets of indicia disposed on opposite sides of a plane transverse to the longitudinal axes of the drum and housing, the corresponding indicia of the respective sets being angularly displaced relative to each other upon the drum circumference, and said housing having a window in the periphery thereof for exposing a portion of one of said sets of indicia and a second window for simultaneously exposing the corresponding indicia of the other set, said windows being also positioned on opposite sides of said transverse plane.

PAUL RIEGGER.